Patented Aug. 19, 1952

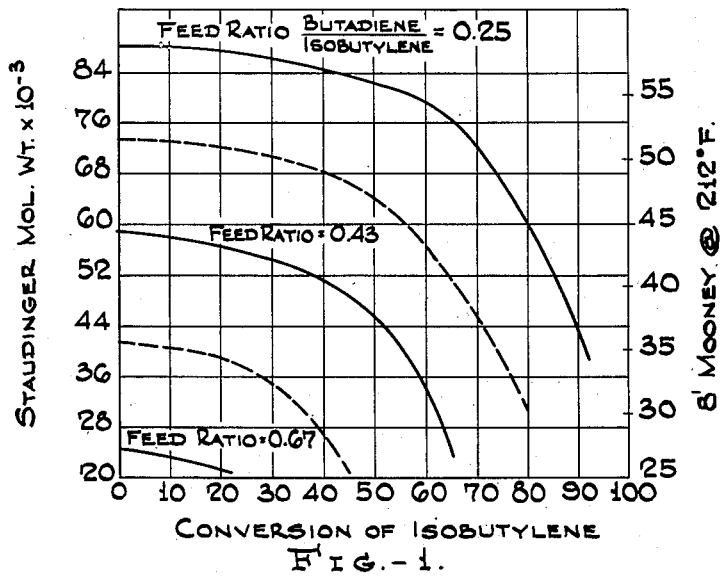
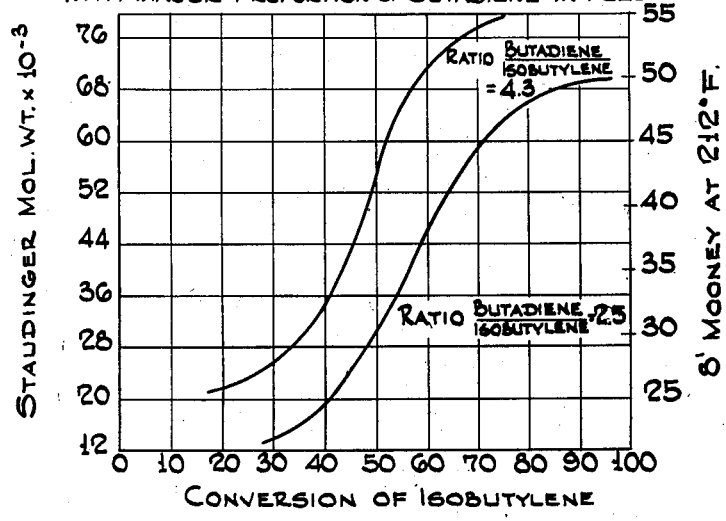

2,607,764

UNITED STATES PATENT OFFICE 2,607,764

VULCANIZABLE COPOLYMERS OF ISOBUTYLENE AND 10-70 PER CENT COMBINED BUTADIENE

Joseph F. Nelson, Clark Township, Union County, and Lester Marshall Welch, Madison, N. J., assignors to Standard Oil Development Company, a corporation of Delaware Application November 28, 1947, Serial No. 788,640

8 Claims. (Cl. 260—85.3)

This invention relates to low temperature polymerization processes and products; relates particularly to the copolymerization of isobutylene and a multi olefin to yield a relatively highly unsaturated, rubbery copolymer; and relates especially to the low temperature copolymerization of isobutylene with a diolefin such as butadiene to produce a copolymer having an iodine number within the range between 50 and 175.

It has previously been found possible to produce a series of very valuable copolymers or interpolymers from a mixture of a major proportion of isobutylene with a minor proportion of a $C_4$ to $C_{14}$ multi olefin having more than one carbon-to-carbon double linkage. The procedure utilizes the steps of cooling the mixture to a temperature between 0° C. and −164° C. then polymerizing the cold mixture by the application thereto of a dissolved Friedel-Crafts catalyst. This reaction has been conducted with isobutylene in major proportion and butadiene in minor proportion in the mixture, to yield an excellent polymer which, when cured, showed good strength and excellent physical properties.

This polymer usually shows an iodine number between about 1 and 10. An iodine number of this value is sufficient to permit of a curing reaction to produce a tensile strength ranging from 1800 to 3600 pounds per square inch at break. This polymer shows a phenomenally high resistance to the passage through it of air, and it has been found to be particularly useful for automobile inner tubes. However, the curing rate is relatively low, and the curing cycle takes an undesirably long time, even under the influence of the most potent accelerators. Also the modulus is undesirably low.

It is found that in order to be curable, the polymer must have a molecular weight above a definite minimum, and must have an iodine number above a definite minimum; these two factors being interrelated in such a fashion as to indicate that each molecule must have more than some definite number of units of residual unsaturation. This minimum is certainly more than 4 and probably more than 8. However, it is established that a minimum Staudinger molecular weight number of about 20,000 is required in any event, and an iodine number of at least 0.5.

However, these requirements are to a considerable extent mutually incompatible. It is well settled that the diolefin, as such, exerts a definite poisoning action on the catalyst and the larger the quantity of diolefin present, the more powerful the poisoning action; this poisoning action serving primarily to reduce the obtainable molecular weight of the polymer. Also, the ratio of copolymerizability varies among the various diolefins. The ratio of copolymerizability of butadiene is relatively quite low; a ratio of 30 parts of butadiene per 100 of isobutylene being required to copolymerize 2 to 3 parts into the polymer molecule. Isoprene is a much more powerful catalyst poison, but its polymerizability ratio is much higher, approximately 3 parts of isoprene per 100 of isobutylene being sufficient to put 1 to 2½ parts into the polymer molecule.

Also, it has been established that the Staudinger molecular weight number is a function of the yield (on the isobutylene) to which the reaction is carried, since the average molecular weight of the polymer drops off sharply as the yield is increased. That is, the Staudinger molecular weight number, and with it the Mooney viscosity value, falls off sharply as the conversion percentage (on the isobutylene) is raised. This is well shown in Figure 1 in which a family of curves for varying ratios of isobutylene to butadiene are shown. A desirable Mooney viscosity for satisfactory milling, calendering and moulding lies in the neighborhood of 40 to 55 since values below 25 show a polymer too soft for satisfactory handling, and values above 60 are too tough to be milled. It should be noted further that the lower the ratio of the diolefin—butadiene—the lower the iodine number and the poorer and lower the curing properties. It will be observed from the curves that a mixture containing a butadiene to isobutylene ratio of 25 to 100 (ratio of 0.25) yields an average Mooney value of 40 at 87% conversion, but the iodine number of this polymer is so low as to make it extremely slow curing, of very low modulus, and a generally unsatisfactory polymer. It will be noted that when the butadiene ratio is raised to 43 parts of butadiene per 100 of isobutylene (a ratio of 0.43), the permissible conversion ratio for a 40 Mooney value is about 42%. This material is readily curable and is a reasonably good polymer, although it still cures undesirably slowly and to an undesirably low modulus. It may further be noted that if the feed ratio is increased to 67 parts of butadiene per 100 of isobutylene (a ratio of 0.67), the very first bit of polymer produced has a Mooney value of about 27, almost too low to be satisfactorily curable. These values seemed to indicate conclusively that the amount of butadiene present must be kept below a ratio of 0.5 to produce usable polymer, and all workers in the field have so understood.

According to the present invention, it is now found that if the polymerization mixture is prepared with a relatively large amount of butadiene present, preferably with a butadiene/isobutylene ratio between 2 and 10, and the amount of polymer produced is preferably limited to a conversion of 40 or 50% based on the amount of polymerizable feed, an excellent polymer is obtained. The resulting polymer shows an iodine number ranging from 60 to 175; shows a very much shorter curing time and a much higher modulus, as well as many other valuable properties.

The polymers of the invention contain from 30% to 85% or 90% copolymerized isobutylene with from 70% to 10% copolymerized butadiene, a relatively very large proportion of butadiene thus being copolymerized into the polymer by the application to the high ratio mixture of a Friedel-Crafts catalyst in solution in a low-freezing, non-complex forming solvent; in the presence of from one volume to five volumes of diluent, or no diluent as desired. The polymerization procedure shows the unexpected and conspicuously advantageous phenomenon of an increase in average molecular weight and Mooney viscosity with increasing conversion. Thus, as shown in Fig. 2, a ratio of butadiene to isobutylene of 2.5 that is, 25 volumes of butadiene to 10 volumes of isobutylene yields, at a 30% conversion (on the amount of isobutylene present), a polymer having a Staudinger molecular weight number of about 14,000 and a Mooney viscosity of about 22; whereas, if the conversion is increased to 56% on the amount of isobutylene present, the Mooney viscosity value of 35 is reached; and if the conversion is carried to 90% or above (based on the isobutylene) a molecular weight of 69,000 and a Mooney viscosity of nearly 50 is obtained. (It may be noted that this procedure leaves a considerable amount of butadiene unpolymerized, but the total amount of isobutylene remaining unpolymerized is much less than in the prior art, and the polymer is of much more satisfactory quality, being faster curing, to higher modulus material of higher tensile strength.) Thus these values for the polymer of the present invention are an iodine number between 60 and 175 and a Staudinger molecular weight number within the range between about 20,000 and 100,000, which is curable to a substance having a tensile strength within the range between 700 and 3600 pounds per square inch; with an elongation within the range between 150% and 1000% at break; a markedly improved modulus and a curing speed much higher than that of a copolymer having an iodine number below 10. Other objects and details of the invention will be apparent from the following description, in which Figure 1 is a family of curves showing the polymerization characteristics according to the prior art; and Figure 2 is a family of curves showing the polymerization characteristics according to the present invention.

The reaction may be conducted in a continuous reactor, or it may be conducted in a succession of separate batches, there being little choice between the two with respect to the quality of the polymer produced.

In either process, there is first prepared a mixture of isobutylene and butadiene in which the butadiene is present in a ratio of at least two with respect to the isobutylene, the limiting ratios being from 2 to 10 or 12 times as much butadiene as isobutylene. It is desirable that relatively high purity components be used, the isobutylene desirably being at least 98% purity and the butadiene desirably at least 96% purity, preferably 98.5% purity when possible, since the reaction proceeds more satisfactorily with chemicals of such purity. It may be noted that the presence of small amounts of saturates such as butane and propane is immaterial, but the presence of propylene, butene-1 or butene-2 is undesirable.

This mixture may be polymerized as such, if desired, but usually, superior results are obtained by polymerization in the presence of a diluent.

For the diluent there may be used one or more of the lower halo-substituted aliphatics such as ethyl or methyl chloride, methylene or ethylene dichloride, chloroform, the several propyl chlorides, the corresponding fluorides, some of the corresponding bromides, and the like. Any of the halo-substituted aliphatics having a melting point below the polymerization temperature are usable as diluents. Alternatively, carbon disulfide or the low-freezing hydrocarbons may also be used; again it being merely necessary that the freezing point of the diluent be below the polymerization temperature.

For the diluent, the requirements are, generally, merely that the substance be a liquid at the polymerizable temperature and that it be non-reactive with the unsaturates and with the catalyst. If it is reactive with the unsaturates, it of course ceases to be a diluent, and if it is reactive with the catalyst, it ceases to be a diluent for the reason that it becomes a catalyst poison. Particularly, any carbon containing substance which is liquid at the polymerization temperature and is free from oxygen, is more or less suitable for use as the diluent. Accordingly, the diluent may properly be defined as a non-oxygenated, carbon containing compound, having a freezing point below the polymerization temperature. In general, such substances are free from catalyst poisoning effects, but the freedom from catalyst poisoning action is essential to the diluent. In general also the requirements for the diluent are closely similar to those for the catalyst solvent subsequently described in that the diluent also must be "low freezing and non-complex forming with the Friedel-Crafts active metal halide substance."

Either before or after mixing, the materials are cooled to a temperature below about −6° C. preparatory to the polymerization procedure. For the polymerization reaction, the preferred temperature lies below −6° C. and preferably within the range between about −40° C. and −103 to −110° C. or even as low as −164° C. The cold mixture is placed in a reactor vessel which may consist of a batch type or a continuous type reactor. In either reactor, it is usually desirable to provide a refrigerating jacket upon the reactor; the jacket being filled with any convenient refrigerant which has a boiling point, with some convenient exhaust pressure, at the desired temperature. Convenient refrigerants are such substances as $CO_2$, either as such or in admixture with an appropriate low-freezing carbon compound such as propyl alcohol or pentane, or the like. Highly satisfactory refrigerants are liquid ethane, setting a temperature of −88° C., and liquid ethylene setting a temperature of −103° C. In both cases, the necessary temperature gradient through the walls of the container yield a temperature in the reaction mixture from 2° to 10° C. higher, but this temperature gradient is not harmful. In some instances, liquid methane under pressure may be used or some of the higher boiling refrigerants under reduced pressure or vacuum may be used.

Alternatively, an internal refrigerant may be used, for which purpose it is necessary that the mixed boiling point be within the desired range and that the internal refrigerant be inert and non-reactive with respect to the Friedel-Crafts catalyst. Liquid or solid $CO_2$, liquid ethane, and liquid ethylene all meet these requirements and are the preferred internal refrigerants.

The reaction mixture is polymerized by the application thereto of a Friedel-Crafts active metal halide catalyst in solution in a low-freezing, non-complex-forming solvent. The preferred catalyst is aluminum chloride. Various other active metal halide substances are also usable including aluminum bromide, the mixed chloro bromides especially of aluminum and of titanium, the chloro alk-oxides, especially of aluminum, and the like. These catalysts cannot be used in solid form, however, because of the low solubility of the solids in the olefinic material or the low rate of solution which permits particles of solids to be surrounded by a very thin layer of polymer which thereafter prevents further solution and further polymerization. Accordingly, it is essential that when a solid, curable polymer is to be made, the catalyst be fluid. Titanium tetrachloride is fluid at room temperature and fluid at a low enough temperature to be readily incorporated into the unsaturate mixture. The other catalyst substances are readily soluble to a satisfactory concentration in the chloro substituted aliphatics or in some instances in the hydrocarbons themselves to produce excellent catalyst solutions which are readily incorporated into the polymerization mixture.

For the catalyst solvent, any non-complex-forming solvent which is liquid when first contacted with the cold reaction mixture and which will dissolve appropriate amounts of the Friedel-Crafts active metal halide catalyst is suitable. For the purposes of this disclosure, any substance having a freezing point below 0° C. is "low-freezing," and any substance which does not cause to separate from the solution, upon evaporation of the solvent, a compound between the solvent and the Friedel-Crafts catalyst; or with which the addition to, or evaporation from the solution of portions of the solvent leads to a substantially continuous change in the composition of the catalyst phase and to continuous increase or decrease in the partial pressure of the solvent; from which, in general, the catalyst substance can be recovered unchanged by removal of the solvent, is non-complex-forming.

Particularly useful are ethyl and methyl chlorides. Similarly useful solvents are such substances as carbon disulfide, methylene dichloride, ethylene di-chloride, chloroform, tri- and tetrachloroethane, ethylidene fluoride, some of the organic chloro fluorides, and the like. Also with such catalysts as aluminum bromide, aluminum bromo-chloride, aluminum chloro-ethoxide, and the like, the lower boiling hydrocarbons are suitable solvents; liquid ethane, liquid propane, liquid butane, liquid pentane, light naphtha, and the like, being excellent solvents.

In conducting the reaction, the reactants, with or without diluent, as desired, are mixed and brought to a suitable temperature, either before or after mixing. The desired temperature is preferably obtained by a refrigerating jacket upon the reactor, but, as above pointed out, this is not necessary.

If the reaction is to be conducted in a series of successive batch operations, the appropriate mixture of unsaturates may be prepared and stored at a reduced temperature until needed, successive batches being withdrawn from storage, delivered to the jacketed reactor, if used, or mixed with the desired internal refrigerant, if the latter is used, and then polymerized by spraying the catalyst onto the surface of the rapidly stirred cold mixture or preferably by delivering the catalyst in the form of a fine high-pressure jet into the body of the cold unsaturates.

The amount of catalyst added is determined by the conversion desired. It will be noted that since the conversion is measured in terms of the amount of isobutylene, not upon the total amount of unsaturates present, the desirable amount of catalyst is such as to yield a polymer having a weight equal to from $2/5$ to the full amount of isobutylene present. This procedure leaves in the polymerizate mixture a considerable quantity of unpolymerized butadiene, and a small quantity of isobutylene. It is made necessary, however, by the fact that the higher polymerizability of the isobutylene compared to the butadiene results in a mixture in which the butadiene ratio is so high that the polymer is undesirably close to being a pure butadiene polymer which, as is well known to workers skilled in the art, is of little or no value. When the desired amount of polymer has been produced, the reaction mixture with the contained polymer is preferably dumped into warm water to bring the solid polymer up to room temperature and vaporize out the residual materials from the polymerization mixture.

Alternatively, if the reaction is conducted in a continuous manner, the reactor is filled with an appropriate mixture of unsaturates which may be the same as the equilibrium mixture obtainable in the reactor after continued operation, or may differ from the equilibrium mixture ultimately obtainable by an amount sufficient to produce polymer of the desired characteristics from the beginning of catalyst addition.

In starting the continuous reactor, the desired composition of unsaturates and diluent or refrigerant, as desired, is delivered to the reactor at a conveniently low temperature, preferably as low as the refrigerant in use will yield. When the reactor is full, and the temperature brought down to the desired low value, a powerful stirrer is brought into action to circulate the material over the cooling jacket walls as rapidly as possible, and the injection of catalyst is then begun. Preferably, the reactor is closed with a tight cover having an appropriate size tubular outlet, so that the reactor is full at all times, and there is no liquid to gas interface in the reactor. The supply streams of unsaturate mixture and catalyst are continued and an overflow of polymer slurry or solution (depending upon diluent) in unpolymerized material is taken out through the overflow tube and preferably delivered into a closed tank of warm water in which the slurry of polymer in cold feed is converted into a slurry in warm water and the voltatile components of the mixture are vaporized and discharged from the top of the water tank to purifying and fractionating equipment by which they are recovered for re-use.

The solid polymer is discharged from the tank as a slurry in water from which it is filtered, dried, and milled for packaging, shipping and use.

Either processing method yields a polymer having a Staudinger molecular weight number lying within the range between about 20,000 to 25,000 and about 80,000 to 100,000. This range is essential because of the fact that polymers having lower molecular weights either do not cure at all, or cure too poorly to be commercially useful and polymers having molecular weights higher than this range are so tough and leathery that they are extremely difficult to process on the mill. It may be noted that there is a fairly wide range of molecular weights in the polymer; a polymer having a molecular weight of 35,000 showing a small amount of material of molecular weight as low as 20,000 and a small amount as high as 60,000 or 70,000. This range of molecular weights depends in part upon the temperature, in part upon the catalyst, and in part upon the proportion of isobutylene and butadiene. The polymer also shows an iodine number within the range between about 60 and about 150; the iodine number being in part determined by the original proportion between the mono-olefin and the multi-olefin, and in part determined by the percentage yield, or the percent of the unsaturates which are copolymerized.

The polymer obtained may be subjected to a considerable range of subsequent treatments. If the polymer is made in a continuous process, the discharged polymer and unsaturate mixture from the polymerizer through an overflow outlet into a tank of hot water yields a slurry of polymer in water which can conveniently be handled through pipes, and pumps, a centrifugal type of pump usually being preferred. The slurry may then be filtered or strained, using such devices as an "Oliver" type filter, in which the carrying liquid is removed by suction and a solid cake scraped off the exterior of a strainer-mesh-covered drum. The water is conveniently heated and returned to the flash tank for the formation of fresh slurry; this being particularly desirable because of the fact that the straining operation does not always separate all of the solid polymer, but allows some of the fine particles to pass through. The solid cake from the filter is conveniently delivered to a traveling belt passing through a tunnel drier oven. The drying operation usually brings the water content well below 1%, and for some purposes this is sufficient. Usually, however, it is preferably to take the cake from the oven, off the end of the traveling belt, and pass it through a high power extruder in which the polymer is heated to a temperature well above the boiling point of water, and, at that temperature is extruded in small strings. This procedure brings the water content well below 0.1%. For operating convenience and to remove substantially all of such residual moisture and any traces of unevaporated volatiles, and also to make sure that any low polymers are removed, the extruder discharge may conveniently be treated on a double roll mill and given a somewhat lengthy milling at relatively elevated temperatures. A continuous discharge is taken from this mill in the form of a narrow strip which is cooled and cut into short lengths and packed in boxes.

The finished polymer is then prepared for use by an appropriate compounding treatment. It is usually desirable to incorporate a substantial amount of reinforcing carbon black. Any of the various types of carbon black are useful, according to the particular structure to be made from the rubber. However, when inner tubes are to be made it is usually desirable to use a reinforcing carbon black such as the type that is described to the trade by the descriptive title "Cabot No. 9." Alternatively, another type of reinforcing carbon black or furnace black, known to compounders by the descriptive name "Kosmobile 66" also is advantageously used. The carbon black may be present in amounts from 10 parts to 100 parts per 100 of polymer and on occasion as much as 200 parts may be used. The compounding recipe also desirably includes from 0.5 part to 10 parts of stearic acid per 100 of polymer. In addition there usually is desirably present from 1 part to about 20 parts of zinc oxide; which may on occasion be replaced by varying amounts, up to about 10 parts, of zinc stearate.

The compounding recipe also includes a curing agent. Sulfur alone is not usually commercially satisfactory because of the extremely slow curing rate and the difficulty of reaching a complete cure. Accordingly a sulfurization aid or "accelerator" is usually included. This may conveniently be tetramethyl thiuram disulfide which, however, may be used in considerably smaller proportions than is required by the low unsaturation polymer of the prior art. Alternatively, however, such agents as mercaptobenzothiazole or zinc mercaptobenzothiazole or selenium tetraethyl dithiocarbamate or tetramethyl thiuram monosulfide or zinc dibutyl dithiocarbamate or dipentamethylene thiuram tetrasulfide, may be used. Any of these agents most of which are of minor or no value with the low unsaturation polymers of the prior art are more or less valuable with the present polymer, as are most of the moderately potent accelerators.

Alternatively such substances as para quinone dioxime or its analogues or homologues or their organic or inorganic esters are particularly valuable since the cure rate is very high and the state of cure excellent.

Alternatively also, the dinitroso compounds are valuable curing agents and with these compounds, particularly, the curing may proceed fairly rapidly at room temperature.

These agents all react with the material to destroy the plasticity which is characteristic of the polymer as it is received from the polymerizer or the drier and develop in it a definite tensile strength and a definite elongation at break and a definite modulus of elasticity (that is the pounds pull per square inch required to stretch the material 300%). This characteristic, plus a substantially complete insolubility (as distinguished from swelling) in light naphtha are the essential features of the cured polymer as distinguished from a thermosetting resin, to which the word "cured" (meaning "heat hardening") is occasionally applied, but wrongly applied. They have no property of cold flow and when set do not have a substantial elongation at break.

The curing operation with this polymer, especially in the presence of reinforcing carbon black yields polymers having a cured tensile strength ranging from a minimum of 700 pounds per square inch up to 3600 pounds or higher, with relatively high modulus and the particularly valuable characteristic of a very rapid curing rate, to a more fully cured condition. Also, the polymer of the present invention can be cured to a good tensile strength and a good modulus without, of necessity, establishing a condition of zero iodine number, thereby making possible some further reactions.

The details of the invention are well shown by the following examples.

EXAMPLE 1

A series of polymerizations were conducted upon successive batches of polymerizate containing varying amounts of butadiene in ratios to isobutylene ranging from 1.8 to 2.7, both substances having a purity of 98% or better. These polymerizations were conducted with isobutane as diluent, approximately three volumes of isobutane being used for each volume of isobutylene. The various batches were polymerized in part only, from 16% to 29% of the isobutylene being polymerized in the various runs. In each polymerization procedure the mixture was cooled to nearly —103° C. by the application of a refrigerating jacket containing liquid ethylene to the reactor.

The catalyst consisted of a solution of aluminum chloride in methyl chloride in a concentration of approximately 0.2%, the catalyst solution being added to the reaction mixture in the form of a high pressure jet into the body of the rapidly stirred cold mixture.

warm water. The diluent and unpolymerized unsaturates were volatilized by the warm water and the solid polymer was then strained out from the water, dried and milled.

After milling, each batch of polymer was separately compounded according to the following recipe:

| | Parts |
|---|---|
| Polymer | 100 |
| Gastex | 50 |
| Zinc oxide | 5 |
| Sulfur | 2 |
| Accelerator, as indicated. | |

Separate portions from each batch were then further compounded with sulfurization aids, as shown, one portion having compounded thereinto one part of the sulfurization aid in the form of benzothiazyl 2-monocyclo hexyl sulfenamide; per 100 parts of polymer. A second portion of each batch then was compounded further with one part (per 100 of polymer) of tetramethyl thiuram disulfide, and one-half part of 2 mercaptobenzothiazole. These portions were then cured, some at 307° F. and some at 320° F. for 10, 20 and 40 minutes, and determinations were then made of the tensile strength, percent elongation at break, and modulus, as shown in the following Table II:

TABLE II

| | Accelerators [1] | Cures at 307° F. | | | | | | | | |
|---|---|---|---|---|---|---|---|---|---|---|
| | | Tensile | | | Elongation | | | 300% Modulus | | |
| | | 10' | 20' | 40' | 10' | 20' | 40' | 10' | 20' | 40' |
| 1 | S | 960 | 2,240 | 2,060 | 750 | 500 | 360 | 370 | 1,250 | 1,690 |
| | T-C | 1,930 | 1,730 | 1,610 | 390 | 280 | 270 | 1,540 | | |
| 2 | S | 440 | 1,510 | 1,580 | 670 | 500 | 410 | 200 | 790 | 1,030 |
| | T-C | 1,510 | 1,600 | 1,500 | 320 | 290 | 270 | 1,400 | | |
| 3 | S | | | | | | | | | |
| | T-C | | | | | | | | | |
| 4 | S | 510 | 1,320 | 1,390 | 510 | 420 | 390 | 320 | 840 | 1,090 |
| | T-C | 1,430 | 1,510 | 1,400 | 300 | 250 | 250 | 1,370 | | |
| 5 | S | 440 | 960 | 1,270 | 460 | 380 | 380 | 270 | 670 | 1,000 |
| | T-C | | | | | | | | | |
| | GR-I (control) T-C | 1,030 | 1,890 | 1,780 | 820 | 760 | 590 | 140 | 470 | 800 |

| | | Cures at 320° F. | | | | | | | | |
|---|---|---|---|---|---|---|---|---|---|---|
| | | Tensile | | | Elongation | | | 300% Modulus | | |
| | | 4 | 8 | 16 | 4 | 8 | 16 | 4 | 8 | 16 |
| 6 | T-C | 1,350 | 1,400 | 1,400 | 310 | 250 | 220 | 1,300 | | |

[1] S=Benzothiazyl 2-monocyclohexylsulfenamide one part based on polymer.
T-C=Tetramethyl thiuram disulfide. One part and mercaptobenzothiazole 0.5 part.

The inspection reports upon these batches of polymer are shown in the following Table I:

TABLE I

*Isobutylene-Butadiene Copolymers of High Unsaturation[1] (completely soluble in hydrocarbons)*

| | Feed, (parts butadiene per 100 of isobutylene) | Diluent | Conversion percent [3] | Staud. Mol. Wt. | Iodine No. |
|---|---|---|---|---|---|
| 1 | 180 | Isobutane 3:1 [2] | 29 | 30,200 | 52 |
| 2 | 210 | do | 16 | 26,200 | 58 |
| 3 | 210 | do | 24 | 20,200 | 70 |
| 4 | 240 | do | 18 | 25,400 | 57 |
| 5 | 270 | do | 16 | 21,400 | 72 |
| 6 | 240 | None | 27 | | 65 |

[1] All polymers prepared in batch reactor at —100° C. using AlCl₃ dissolved in MeCl (0.2 g. AlCl₃/100 ml. MeCl).
[2] Volumes of isobutane per volume of isobutylene.
[3] Based on isobutylene.

These various polymers were recovered by dumping the partially polymerized mixture into These results show the excellent quality of the polymer obtained by this procedure and the excellent curing rate, tensile strength, elongation at break, and modulus obtainable.

These results also show the very greatly increased rate of cure of this relatively highly unsaturated copolymer. In Table II there is shown, for comparative purposes, the rate of cure of the low unsaturation copolymer of isobutylene with isoprene produced under the direction of the Rubber Reserve Board for the use of the armed forces of the United States under the descriptive title of "GR-I." It will be noted that the polymer of the present invention cures much more rapidly than does the standard GR-I. It will be noted from this table that in 10' #1 goes to 1540 modulus and GR-I goes to 140. Thus the highly unsaturated polymers gave eleven times higher modulus than GR-I at the same cure time. In effect this means that polymers of this nature can be cured without high concentrations of expensive accelerators such as tetramethyl thiuram disulfide or a satisfactory cure can be obtained by the use of cheaper accelerators such as benzothiozyl 2-monocyclohexylsulfenamide (Santocure) or similar accelerators of lower potency.

EXAMPLE 2

A similar series of batch polymerizations were conducted as shown in Table 3, using mixtures containing from 24 to 9% of isobutylene, and from 76 to 91% of butadiene; some utilizing normal butane as the diluent, some methyl chloride, and in some instances no diluent. In each instance the conversion is based on isobutylene although a considerable amount of the butadiene is copolymerized as evidenced by the iodine number or by material balance. For example, the last polymer in Table III contained at least 50% butadiene copolymerized with the isobutylene.

TABLE III

*Isobutylene-butadiene copolymers of high unsaturation (not completely soluble in hydrocarbons)*

| Feed (weight percent on total unsaturates) | | Diluent | Conversion of Isobutylene percent | Mooney 8 @ 212 | Iodine Number |
|---|---|---|---|---|---|
| Isobutylene | Butadiene | | | | |
| 24 | 76 | n-butane (1:1) | 81 | 45 | 66 |
| 21 | 79 | Methyl Chloride (1:1) | 57 | 50 | 66 |
| 19 | 81 | n-butane (1:1) | 58 | 48 | 81 |
| 19 | 81 | n-butane (1:1) | 63 | 56 | 122 |
| 19 | 81 | n-butane (1:1) | 58 | | |
| 16 | 84 | n-butane (1:1) | 48 | 40 | 165 |
| 16 | 84 | n-butane (1:1) | 51 | | |
| 13 | 87 | n-butane (1:1) | 51 | 47 | 158 |
| 13 | 87 | n-butane (1:1) | 47 | | |
| 29 | 71 | None | 27 | 27 | 65 |
| 29 | 71 | do | 20 | 27 | 63 |
| 9 | 91 | n-butane (2.5:1) | (¹) | 25 | 100 |

¹ Conversion on total feed 18%—assuming all isobutylene copolymerized the polymer contains 50% isobutylene+50% butadiene.

The copolymerizability ratio above-mentioned may be defined as the relationship between the amount of diolefin in the polymer divided by the amount of olefins in the polymer, the result being divided by the weight of diolefin in the reactor liquid divided by the weight of olefin in the reactor liquid or mathematically, the copolymerization ratio $a$ may be defined by the following equation:

$$a = \frac{\dfrac{\text{weight diolefin in copolymer}}{\text{weight olefin in copolymer}}}{\dfrac{\text{weight diolefin in reactor liquid}}{\text{weight olefin in reactor liquid}}}$$

Plant experience shows that for isoprene the value of $a$ is 0.5 to 1 whereas for butadiene the value of $a$ is from 0.025 to 0.048.

Thus the process of the invention prepares a mixture of isobutylene and butadiene in which the butadiene is present in the ratio of at least 1.8, the ratio of the invention ranging from 1.8 to 10 or 12, to which there is then added, if desired, from 1 to 5 or 6 volumes of inert diluent which is liquid at the reaction temperature and the mixture with or without diluent is then polymerized at a temperature within the range between −40° C. and −110° C. by the application to the cold isobutylene-butadiene mixture of a Friedel-Crafts active metal halide catalyst in solution in a low-freezing, non-complex-forming solvent such as aluminum chloride in solution in methyl chloride to yield a copolymer having a Staudinger molecular weight number within the range between 20,000 and 100,000, an iodine number within the range between 60 and 175 and reactivity with curing agents such as sulfur, the quinone dioximes and the dinitroso compounds to yield a cured polymer having a tensile strength within the range between 1000 and 4000 pounds per square inch.

While there are above disclosed but a limited number of embodiments of the composition and process of the invention, it is possible to provide still other embodiments without departing from the inventive concept herein disclosed.

The invention claimed is:

1. A low temperature polymerization process which comprises mixing 91 parts by weight of butadiene, 9 parts by weight of isobutylene and 2.5 volumes of normal butane per volume of isobutylene, cooling the mixture to a temperature of about −103° C. and adding thereto a solution containing about 0.2 grams of aluminum chloride per 100 ml. of methyl chloride to obtain a rubber-like copolymer having an 8-minute Mooney Viscosity of at least about 25 at 100° C.

2. A low temperature polymerization process comprising the steps of mixing together 1 part by weight of monomeric isobutylene and 1.8 to 10 parts by weight of monomeric butadiene, cooling the mixed olefinic material to a temperature within the range between −40° C. and −164° C., and thereafter polymerizing the mixture to at least 20% conversion based on the total isobutylene by the application thereto of a Friedel-Crafts active metal halide catalyst in solution in a low-freezing, non-complex-forming solvent.

3. A low temperature polymerization process comprising the steps in combination of preparing a mixture of 1 part by weight of isobutylene monomer and 1.8 to 10 parts by weight of butadiene monomer, delivering a continuing stream thereof to a reaction zone at a temperature within the range between −40° C. and −164° C., simultaneously delivering to the reaction zone a continuing stream of a solution of an aluminum halide catalyst dissolved in a low-freezing, halogenated alkane having 1 to 2 carbon atoms per molecule as solvent to polymerize the mixture to at least 20% conversion based on the total isobutylene, collecting an overflow from the said reaction zone in a warm liquid to volatilize out the reactants to produce a copolymer.

4. A synthetic, solid, rubber-like interpolymer of butadiene and isobutylene, characterized by a Wijs iodine number above 50 but not above 175, a Staudinger molecular weight between 20,000 and 100,000, and ready vulcanizability to a cured synthetic rubber having a tensile strength of 1,000-4,000 pounds per square inch, and an elongation of 150-1,000%.

5. A synthetic, solid, rubber-like interpolymer of 10 to 70% combined butadiene and 90 to 30% combined isobutylene, characterized by a Wijs iodine number between 60 and 165, a Staudinger molecular weight between 30,000 and 100,000 and ready vulcanizability to a cured synthetic rubber having a tensile strength of 1,000-4,000 pounds per square inch, and an elongation of 150-1,000%.

6. A low temperature polymerization process comprising the steps of mixing together 1 part by weight of isobutylene monomer and 1.8 to 10 parts by weight of butadiene monomer, and 1 to 6 volumes of inert diluent per volume of isobutylene, cooling the material to a temperature within the range between −40° C. and −164° C., and thereafter polymerizing the mixture to a conversion of 30 to 90% based on the total isobutylene, by the application thereto of a solution of aluminum chloride in an alkyl chloride of 1 to 2 carbon atoms to obtain a copolymer having a Staudinger molecular weight between 20,000 and 100,000, and an iodine number between 60 and 175 as measured by the Wijs method.

7. A low temperature polymerization process comprising the steps of mixing together 71 to 91 weight per cent of butadiene monomer and 29 to 9 weight per cent of isobutylene monomer, cooling the material to a temperature within the range between −40° C. and −164° C., and thereafter polymerizing the mixture to at least 20% conversion based on the total isobutylene by the application thereto of a solution of aluminum chloride in methyl chloride until a copolymer is obtained having a molecular weight between 20,000 and 100,000, and an iodine number between 60 and 175 as measured by the Wijs method, and having 10-70% of combined butadiene and 90-30% of combined isobutylene.

8. A synthetic, solid, rubber-like interpolymer of 10 to 70% combined butadiene and 90 to 30% combined isobutylene, characterized by a Wijs iodine number between 60 and 165, a Staudinger molecular weight between 30,000 and 100,000 and ready vulcanizability to a synthetic rubber having a modulus of about 1300 to 1540 pounds per square inch at 300% elongation.

JOSEPH F. NELSON.
LESTER MARSHALL WELCH.

REFERENCES CITED

The following references are of record in the file of this patent:

UNITED STATES PATENTS

| Number | Name | Date |
|---|---|---|
| 2,180,082 | Cunradi | Nov. 14, 1939 |
| 2,305,007 | Hopff | Dec. 15, 1942 |
| 2,356,128 | Thomas | Aug. 22, 1944 |
| 2,476,000 | Sparks | July 12, 1949 |

OTHER REFERENCES

Kemp et al., Ind. Eng. Chem., Anal. Ed., 15, pps. 453-459 (July 1943).